Oct. 8, 1963

G. W. BENNETT 3,106,352

TRANSLATION APPARATUS

Filed July 28, 1961

INVENTOR.
George W. Bennett
BY
Frank G. Bower
his ATTORNEY

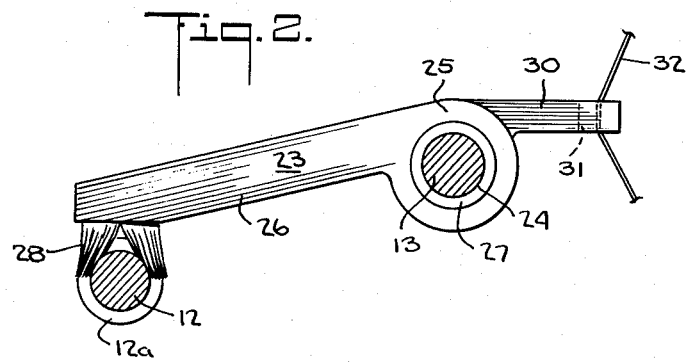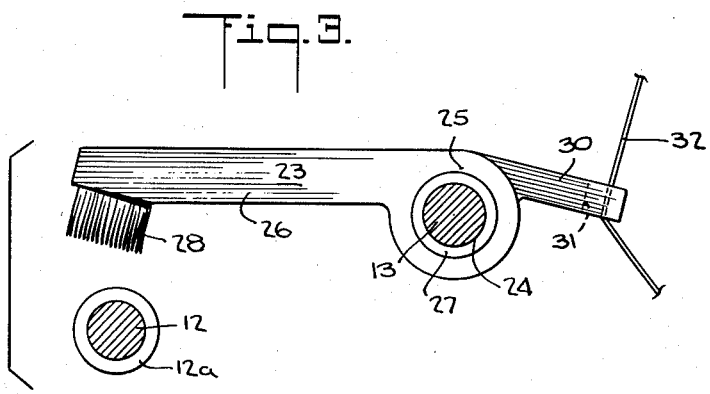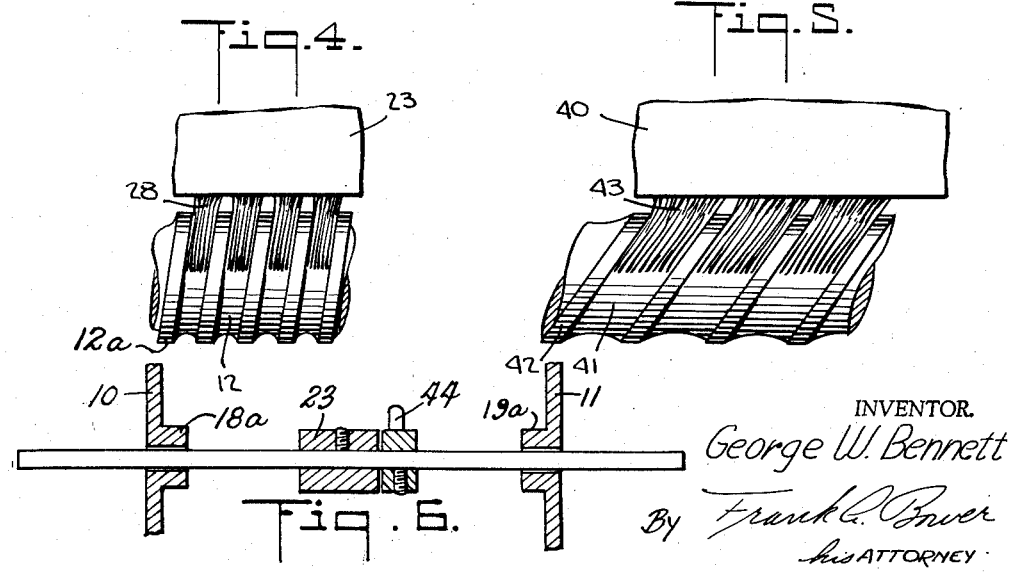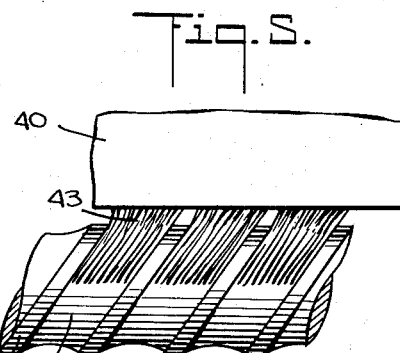

United States Patent Office 3,106,352
Patented Oct. 8, 1963

3,106,352
TRANSLATION APPARATUS
George W. Bennett, Bronxville, N.Y., assignor to Ward Leonard Electric Co., Mount Vernon, N.Y., a corporation of New York
Filed July 28, 1961, Ser. No. 127,669
5 Claims. (Cl. 242—9)

This invention relates to apparatus for translating rotary motion to linear motion or linear motion to rotary motion, and is directed particularly to translation apparatus using a helically threaded shaft contacted by a linearly movable member.

In past translation devices the threaded shafts have been engaged by a nut having threads matching the threads of the shaft. In these devices the nut moves in and out of engagement to initiate and terminate the linear movement while the shaft is rotating. The difficulty with such devices is that the threads of the nut do not always match the position of the threads of the shaft. This causes either an axial jump to the engaged position or a lag in linear motion until the threads of the nut and shaft match. Thus an instantaneous or immediate linear movement cannot be secured or depended upon.

An object of this invention is to provide a translation device that cannot produce a mismatching of engaging surfaces.

Another object of the invention is to provide a translation device with a linear moving member that can engage any type of thread.

Another object of the invention is to provide a linear moving element that is not affected by deviations in the thread of the rotating shaft.

Other and further objects of the invention will be apparent from the following description taken in connection with the drawings in which FIG. 1 is a perspective view of the apparatus;

FIG. 2 is a sectional view taken along lines 2—2 of FIG. 1;

FIG. 3 is a sectional view taken along lines 2—2 of FIG. 1 with the linearly movable element in disengaged position;

FIG. 4 is a side view of the linearly movable element and the rotary element;

FIG. 5 is a side view of a translation apparatus in which the linearly movable member drives the rotary member; and FIG. 6 is a sectional view along the axis 13 of an embodiment in which the guide rod slides in the bosses.

Figure 1:
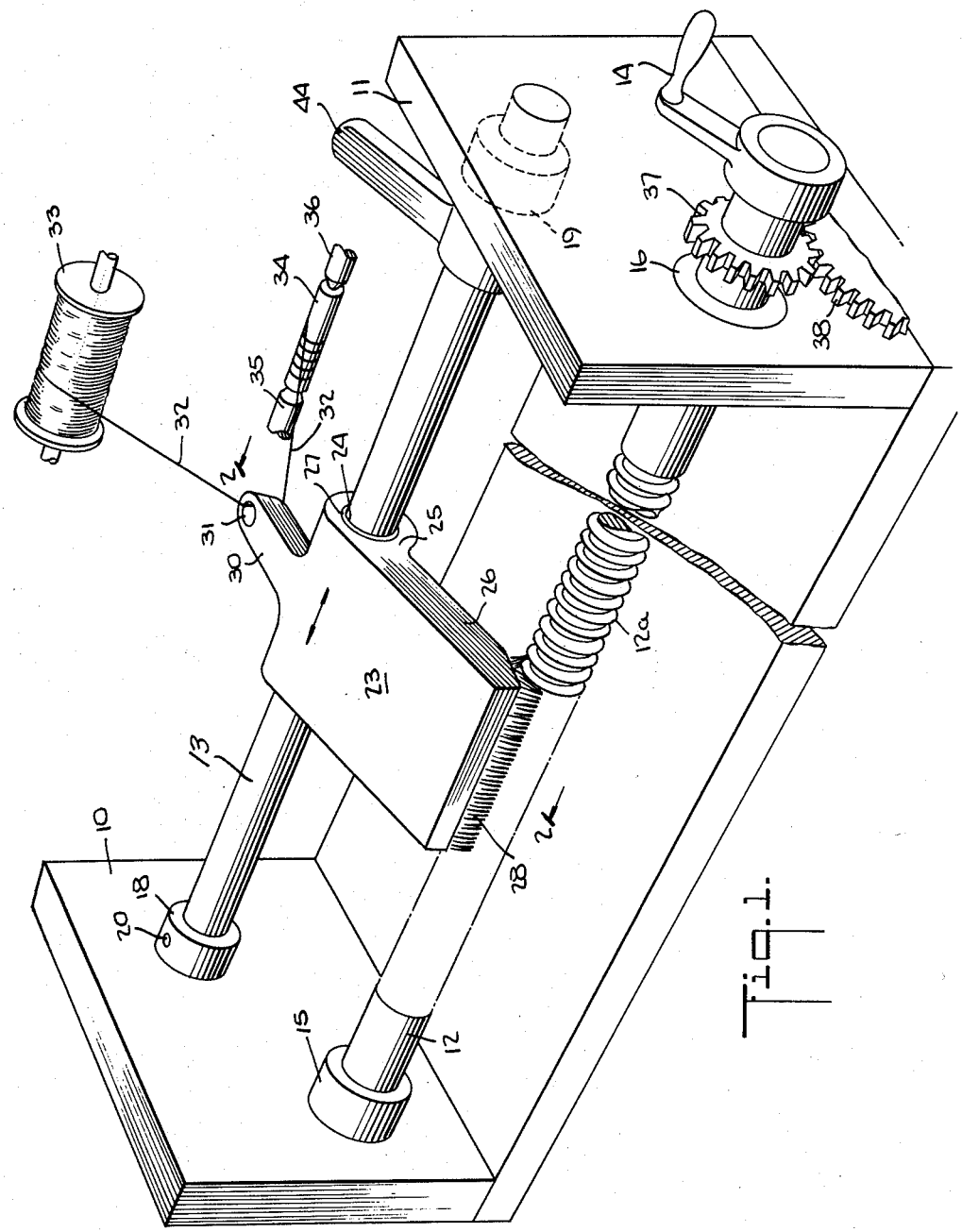

The translation device comprises two end blocks 10 and 11 for rotatably supporting a shaft 12 and fixedly supporting a guide rod 13 having its surface extending parallel to the central axis of the rotatable shaft 12. A helical thread 12a is formed on the rotatable shaft and turns on rotation of the shaft. Any suitable rotating means may be attached to the shaft such as a crank 14, electric drive or other drive means. The shaft is mounted in bearings 15, 16 in the respective blocks 10, 11.

The guide 13 may be a cylindrical rod with the axis of the rod parallel to the axis of the shaft. The rod snugly fits in bosses 18 and 19 in the blocks 10, 11 and is held in place by pins 20 dropping through holes in the rod and bosses. In FIG. 1 the guide rod 13 is rotatably mounted in the blocks 10 and 11 and held against longitudinal movement by the collars 18, 19. In FIG. 6 the guide rod 13 is rotatably and slideably mounted in the bosses 18a and 19a formed as part of the blocks 10 and 11 with the handle 44 positioned adjacent to the member 23 and the member 23 secured to the guide rod 13 to rotate therewith on actuation of the handle 44.

Slideably mounted on the rod is a linear translating member 23 having a cylindrical member 25 with a passage 24 formed by a bearing 27. The bearing 27 snugly grips the guide rod so that there is no lateral play. The translating member 23 instead of being slideably mounted on the guide rod 13 may be secured to the rod and the rod 13 may be slideably and rotatably mounted in the bosses 18 and 19 so that the translating member and brush 28 may be rotated to separate the brush from the threaded shaft 12 and move back and forth out of engagement with the threads for positioning the translating member. A handle 44 may be provided on the shaft for this purpose. An arm 26 extends from cylindrical member 25 and has a thread engaging means 28 extending parallel to the shaft and guide rod for fitting into the thread on the shaft. The thread engaging means 28 comprises flexible filaments which are axially movable and radially yieldable. In this embodiment a brush is used with natural or plastic or other type of bristles which fit between the flanks of the thread to form a firm force transmitting contact with the threads. The bristles accommodate the thread and thus the proper matching of the linear member to the rotating member is automatically accomplished. The bristles form a uniformly flexible contactor which extends longitudinally of the threaded shaft a distance substantially greater than the width of the groove. The brush presents a uniformly flexible surface which may be indiscriminately engaged to form a firm contacting engagement with the sides of the threads. If the direction of rotation is reversed, the bristles do not shift or change position but promptly reverse the direction of movement of the linear member without any readjustment of the relationship of the rotary member to the linear member. Thus there is no lag in reversal of the linear member with respect to the rotation of the shaft.

The linear translating member may be used to impart an even and prompt linear motion to many different types of devices. In FIG. 1 it is coupled to a resistor wire winding machine. A projection 30 extends from the member normal to the direction of movement and has a hole 31. Wire 32 from the supply spool 33 extends through the hole and is attached to the base 34 of the resistor. The base 34 is rotatably mounted in the spindles 35, 36. The base is rotated by an electric motor (not shown) and the shaft 12 is also rotated by an electric motor through gears 37, 38 to move the translating member linearly and the wire along the base. On completion of the resistor the wire is fastened to the base and cut. The translating member 23 is rotated to disengage the thread engaging means from the threads and to slide the member to the initial position. The thread engaging means is then set on the shaft 12 for another run. The intermeshing of the bristles and the threads provides for a prompt response of the translating member to the rotation of the shaft 12. This prompt response is quite desirable when the shaft 12 and the driving of the base 34 of the resistor are synchronized so that the resistance wire is moved longitudinally along the base 34 by the translating member 23 at the same time that the base is started to rotate so that an even spacing of the turns of the wire is produced.

In the foregoing embodiment the shaft 12 is the driving element. In the embodiment of FIG. 5 the linear translating member 40 is the driving member and the shaft 41 the follower. The shaft 41 has a thread 42 with a pitch greater than the pitch of the thread 12a of the shaft 12 so as to provide less resistance to the brush 43. The bristles of the brush fit in the grooves in a similar manner to the bristles of the brush 28.

The thread engaging member may be of other forms than a brush. A soft flexible material that intermeshes with the threads and is axially movable and radially yieldable may be used.

I claim:

1. A translating mechanism comprising a rotatable threaded shaft having a helical thread forming a plurality of turns, a member, means for supporting said member to move longitudinally to said threaded shaft, and said member having a brush with a plurality of bristles filling the groove between the turns of the thread for engaging and meshing with the threaded shaft in a firm force transmitting contact with the threaded shaft for instantaneous response of said member to the rotation of said shaft.

2. A translating mechanism comprising a rotatable threaded shaft having a helical thread and groove forming a plurality of turns, a second shaft spaced from and extending parallel to said threaded shaft, a member mounted on said second shaft and rotatable about its axis and having a brush spaced from said second shaft, said brush having a plurality of bristles for engaging said threaded shaft to simultaneously engage facing sides of the turns of the thread in a firm force transmitting contact with both facing sides for movement linearly without lag on rotation of the threaded shaft.

3. A translating mechanism as set forth in claim 2 wherein said member and said second shaft are fastened in fixed relation to one another and said second shaft is slideably and rotatably mounted for moving said brush linearly in relation to said shaft and moving said brush in and out of engagement therewith.

4. A translating mechanism as set forth in claim 2 wherein said second shaft is fixedly mounted in relation to said threaded shaft and said member is rotatably and slidably mounted on said second shaft to move said brush linearly in relation to said threaded shaft and in and out of engagement therewith.

5. An apparatus for winding resistance wire on a base comprising means for rotatably supporting a base, a member for linearly moving in relation to said supporting means for guiding the resistance wire along a base, a threaded shaft having a helical thread and groove and a second shaft spaced from and extending parallel to said threaded shaft for supporting said member to move linearly in relation to said threaded shaft and said base supporting means, said member being mounted for movement in and out of engagement with said threaded shaft and having a threaded contactor of soft uniformly flexible material extending longitudinally of the shaft a distance substantially greater than the width of the groove for uniform engagement of the thread along the contactor to simultaneously engage facing sides of the thread in a firm force transmitting contact with both facing sides to couple said member and said shaft for instantaneous movement of said member on rotation of said shaft to uniformly move the member in relation to a base held by said supporting means for a uniform winding of the turns of wire on a base.

References Cited in the file of this patent

UNITED STATES PATENTS

| | | |
|---|---|---|
| 821,071 | Weber | May 22, 1906 |
| 1,921,235 | Lindsey | Aug. 8, 1933 |
| 2,512,514 | Adell | June 20, 1950 |
| 2,964,252 | Rosenberg | Dec. 13, 1960 |